United States Patent [19]

Bando

[11] Patent Number: 5,181,489
[45] Date of Patent: Jan. 26, 1993

[54] ROTARY ENGINE

[75] Inventor: Yoshihiro Bando, Tokushima, Japan

[73] Assignee: Bando Kiko Co., Ltd., Tokushima, Japan

[21] Appl. No.: 814,615

[22] Filed: Dec. 30, 1991

Related U.S. Application Data

[62] Division of Ser. No. 448,100, Dec. 13, 1989, Pat. No. 5,121,721.

[30] Foreign Application Priority Data

| | | | |
|---|---|---|---|
| Dec. 24, 1988 | [JP] | Japan | 63-327261 |
| May 24, 1989 | [JP] | Japan | 1-132150 |
| May 25, 1989 | [JP] | Japan | 1-136959 |
| Jun. 7, 1989 | [JP] | Japan | 1-145594 |
| Jun. 29, 1989 | [JP] | Japan | 1-169021 |
| Jul. 1, 1989 | [JP] | Japan | 1-169998 |

[51] Int. Cl.⁵ ............................................. F02B 53/04
[52] U.S. Cl. ................................. 123/242; 123/216; 418/15
[58] Field of Search ............... 123/242, 200, 203, 216; 418/61.2, 15

[56] References Cited

U.S. PATENT DOCUMENTS

| | | | |
|---|---|---|---|
| 4,135,485 | 1/1979 | Loyd, Jr. | 123/242 |
| 4,425,883 | 1/1984 | Tadokoro et al. | 123/242 |

*Primary Examiner*—Richard A. Bertsch
*Assistant Examiner*—Charles G. Freay
*Attorney, Agent, or Firm*—Nixon & Vanderhye

[57] ABSTRACT

A rotary engine that comprises a rotor having two side faces, a side housing disposed facing to one of the two side faces of the rotor and a center housing disposed facing to the other of the two side faces of the rotor. The side housing has an intake port formed therein. Also, the center housing has an intake port formed therein. The intake port of the center housing has an opening end which is dislocated from an opening end of the intake port formed in the side housing facing thereto to a retard side. A space is formed between the side face of the rotor and the center housing. And a relief hole is provided in the center housing in a dislocated portion of the opening end of the intake port of the center housing so as to escape a blow-bye gas pressure from the space.

2 Claims, 9 Drawing Sheets

ROTARY ENGINE

This application is a divisional of application Ser. No. 07/448,100 filed Dec. 13, 1989 which issued as U.S. Pat. No. 5,121,721 on Jun. 16, 1992.

BACKGROUND OF THE INVENTION

The present invention relates to a rotary engine, especially it relates to improvements of a rotary engine that comprises a trochoid rotor housing and a rotor which is mounted on an eccentric shaft in the housing. More particularly, the invention relates to a side port intake type rotary engine wherein intention is made to equalize the blow-bye gas pressure in both side face spaces of the rotor between the side face of the rotor and the housing member thereof disposed in each of the sides of the rotor, that is, between the rotor and the side housing member and the intermediate housing member in both sides of the rotor (in the side face space of the rotor between the side seal and the oil seal).

That is, the present invention relates to a rotary engine in which the blow-bye gas pressure difference between both sides of the rotor is attenuated which blow-bye gas leaks into the inside of the side seal disposed in each side of the rotor.

The present invention also relates to improvements of a Wankel type rotary engine which is of a side intake port type in which intake gas is introduced through an intake port disposed independently in each side of the rotor. More particularly, the invention relates to improvements of an intake port portion of the center housing (intermediate housing) of the rotary engine which comprises an injector for electronically controlled fuel injection at the intake port portion to enhance the engine power.

The gas pressure difference between both sides of the rotor is resulted from the following structure of the rotary engine in accordance with the related art.

That is, both side seals covering the side faces of the rotor are not exactly the same in terms of dimension, profile and matching state with the sealing groove so that the introduction rate of the high temperature and high pressure combustion gas is different for each of the side faces of the rotor.

In accordance with the related art rotary engine comprising an electronically controlled fuel injection system using an injector, the intake port of the intermediate housing on which the injector is disposed is smaller than that of the side housing, therefore the end portions of the intake ports of the intermediate housing and the side housing are not aligned with each other.

Therefore, the opening ends of the two intake ports of the two opposing housings are dislocated with respect to each other. More precisely, the opening end of the main intake port of the intermediate housing is located in the retard side with respect to that of the side housing.

As a result of such a misalignment of the intake ports disposed in both sides of the rotor, especially that of the opening ends thereof, the timing of connection between the intake port and the side face space of the rotor becomes different for each of the sides of the rotor, respectively, according to the rotation of the rotor.

Therefore, the timing of flowing the blow-bye gas which leaks through the side seal of the rotor into the inside thereof becomes different for each of the sides of the rotor. More precisely, with regard to the rotor side face space which in advance comes in contact with the intake port, the blow-bye gas passes through the space ahead so that the pressure in the space of this side is lowered while the other side space is still maintained at a high pressure since the space of the other side has not come in contact with the intake port yet.

Due to the above-mentioned pressure difference between the both sides of the rotor, the rotor is forced to shift to one of the sides thereof. Assuming that the pressure difference is 1 $kg/cm^2$, the rotor is urged by a force of 70 $kg/cm^2$ since the area of the side face of the rotor (the area of the blow-bye gas reservoir between the side seal and the oil seal) is usually 70 $cm^2$. Due to this force, one of the sides of the rotor is pressed against the side housing whereas the side seal of the other side of the rotor is instantly separated from the other side housing.

Therefore, frictional resistance is generated between the rotor and the one of the side housings while the high pressure gas further leaks into the side face space of the other side of the rotor through the side seal so that the engine is excessively heated due to the leakage of the high temperature combustion gas. This causes loss of power and overheat of the engine.

It is to be noted that, in the related peripheral intake type rotary engine comprising an intake port disposed inside of the rotor housing trochoid surface, in order to equalize the blow-bye gas pressure in both sides of the rotor to cope with the above-mentioned problems, a gas pressure balance port is provided through the rotor to connect both sides thereof. However, the balance port is a simple hole penetrating through the rotor and the opening surface plane of the hole is the same as that of the rotor side surface. Therefore, the gap between the opening on the rotor side face and the sliding surface of the side housing (or intermediate housing) is very small (about 0.2 mm) and the passage space toward the balance port is very narrow so that flow resistance is large and flow rate is small. Therefore, the problems due to the pressure difference between both sides of the rotor are not obviated by the related balance port structure.

Actually, the engine provided with such a balance port is not commercialized.

In accordance with the related rotary engine provided with an electronically controlled fuel injection system using an injector, the diameter of the intake port disposed on the injector side is smaller than that of the intake port disposed on the side housing. Therefore, the location of the intake ports are not the same.

Accordingly, the opening end of the intake port of one of the sides of the rotor (inside of the side seal) is dislocated from that of the other side of the rotor.

For example, the misalignment of the opening ends of the intake ports is about 20 mm between the both sides of the rotor of a turbo rotary engine mounted on an automobile commercialized from Matsuda Co. limited. With regard to a nonturbo rotary engine commercialized from the company, the misalignment is about 10 mm.

As a result of such a misalignment of the intake ports disposed in both sides of the rotor, especially that of the opening ends thereof, the timing of connection between the intake port and the side face space of the rotor becomes different for each of the sides of the rotor, respectively, according to the rotation of the rotor.

Therefore, the timing of flowing the blow-bye gas which leaks through the side seal of the rotor into the inside thereof becomes different for each of the sides of the rotor. More precisely, with regard to the rotor side face space which in advance comes in contact with the intake port, the blow-bye gas passes through the space ahead so that the pressure in the space of this side is lowered while the other side space is still maintained at a high pressure since the space of the other side has not come in contact with the intake port yet.

Due to the above-mentioned pressure difference between the both sides of the rotor, the rotor is forced to shift to one of the sides thereof. Due to this force, one of the sides of the rotor is pressed against the side housing whereas the side seal of the other side of the rotor is instantly separated from the other side housing.

Therefore, frictional resistance is generated between the rotor and the one of the side housings while the high pressure gas further leaks into the side face space of the other side of the rotor through the side seal so that the engine is excessively heated due to the leakage of the high temperature combustion gas. This causes loss of power and overheat of the engine.

SUMMARY OF THE INVENTION

It is therefore an object of the present invention to provide a rotary engine in which the above-mentioned problems are obviated by minimizing the pressure difference of the blow-bye gas which leaks into the inside of the side seal disposed in each of the sides of the rotor.

The object of the invention can be achieved by a rotary engine comprising: a rotor having two sides; a side housing disposed in one of the two sides of the rotor, the side housing having an intake port; and a center housing disposed in the other side of the rotor and having an intake port which has an opening end which is dislocated to a retard side with respect to that of the side housing facing thereto, a relief hole being provided at a dislocated portion of the opening end of the center housing so as to escape a blow-bye gas pressure in a rotor side space.

The object of the invention can also be achieved by a rotary engine comprising: a rotor having two side faces; a side housing disposed in one of the two sides of the rotor, each side housing having an intake port; and a center housing disposed in the other side of the rotor and having an intake port which has an opening end which is dislocated to a retard side with respect to that of the side housing facing thereto, a recess being provided at a lower part of a dislocated portion of the opening end of the center housing.

The object of the invention can also be achieved by a side intake port type rotary engine comprising: a rotor having a through hole communicating both sides thereof at a position between a side seal and an oil seal and a chamfer formed surrounding an opening end of the through hole in each side of the rotor; an intermediate housing disposed in one of the sides of the rotor and having an intake port; and a side housing disposed in the other side of the rotor and having an intake port.

The object of the invention can also be achieved by a side intake port type rotary engine comprising: a rotor having a through hole communicating both sides thereof at a position inside of a side seal; an intermediate housing disposed in one side of the rotor and having an intake port; and a side housing disposed in the other side of the rotor and having an intake port.

The object of the invention can also be achieved by a side intake port type rotary engine comprising: an electronically controlled fuel injector; a rotor; and a pair of side housings disposed in both sides of the rotor, each side housing having an intake port which has an opening end in such a position that a gas pressure in both side face spaces of the rotor is balanced and equalized.

The object of the invention can also be achieved by a side intake port type rotary engine comprising: an electronically controlled fuel injector; a rotor; and a pair of side housings disposed in both sides of the rotor, each side housing having an intake port which has an opening end at a same position as the other side housing.

Advantages of the above-mentioned rotary engine are that it makes it possible to avoid the gas pressure difference between the both sides of the rotor so that the rotor is prevented from being urged to one side thereof due to the pressure difference and that the side seals disposed on both side faces of the rotor become to slide evenly on both side planes of the housing facing thereto.

Therefore, another advantage of the above-mentioned rotary engine is that it makes it possible to prevent the high pressure gas from entering into the inside of the rotor through the upper edge of the side seal when the seal is disconnected from the side plane of the housing, thus avoiding the leakage of gas and overheat of the engine.

Especially, it is another advantage of the above-mentioned rotary engine that it makes it possible to avoid overheat of the engine since the gas leakage into the inside of the rotor is reliably prevented, which makes it possible to avoid the overheat of engine due to the pressure difference in a multi-rotor engine such as a three-rotor engine or a four-rotor engine wherein the problem of the pressure difference was supposed to be difficult to overcome in accordance with the prior art structure.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter with reference to the drawings in comparison to the structure of related art which is the one before the improvements of the present invention are made and known to the inventors.

Figure 16:
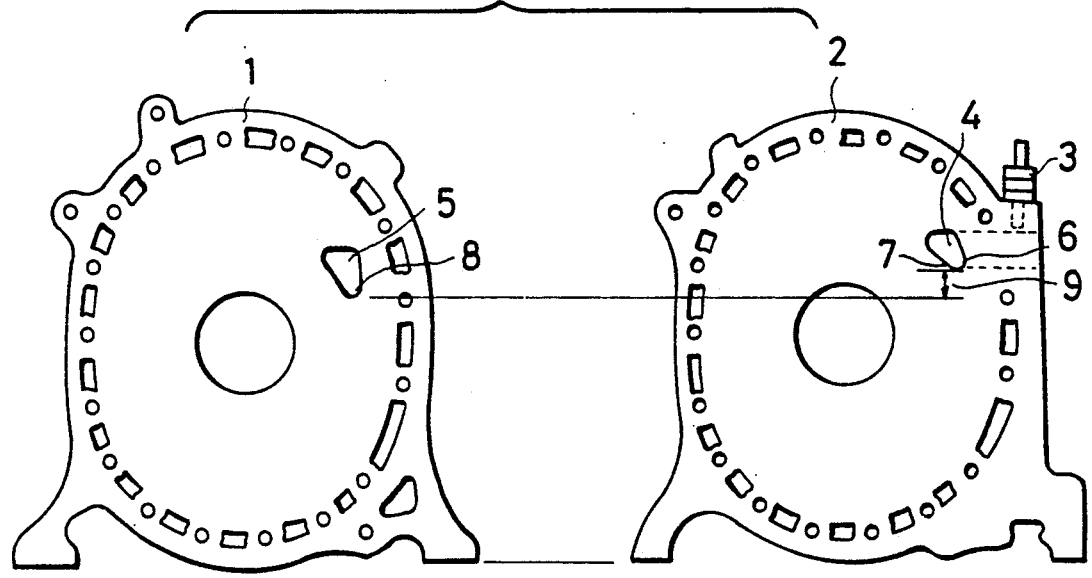
FIG. 16 is an explosive inside view of the rotary engine in accordance with the related art, illustrating the side housing and the center housing thereof for the sake of explanation.

FIG. 16 illustrates an electronically controlled fuel injection type rotary engine using an injector in accordance with the related art before improvements of the present invention.

In accordance with the related art rotary engine provided with an electronically controlled fuel injection system using an injector 3, the diameter of the intake port 4 disposed in a center housing 2 (in the injector side) is smaller than that of the intake port 5 disposed in a side housing 1. Therefore, the elevational location of the intake ports 4 and 5 are not the same.

Accordingly, the opening end 6 of the intake port 4 of the center housing 2 disposed in one of the sides of the rotor (inside of the side seal) is dislocated from the opening end 8 of the intake port 5 of the side housing 1 disposed in the other side of the rotor. The misalignment of the opening ends 6 and 8 of the two intake ports 4 and 5 are designated by a dislocated portion 9 in the drawing.

As a result of such a misalignment of the intake ports 4 and 5 disposed in both sides of the rotor, especially that of the opening ends 6 and 8 thereof, the timing of connection between the intake port and the side face space of the rotor becomes different from each other for each of the sides of the rotor, respectively, according to the rotation of the rotor.

Therefore, the timing of flowing the blow-bye gas which leaks through the side seal of the rotor into the inside thereof becomes different for each of the sides of the rotor. More precisely, with regard to the roter side face space which in advance comes in contact with the intake port, the blow-bye gas passes through the space ahead so that the pressure in the space of this side is lowered in advance while the other side space is still maintained at a high pressure since the space of the other side has not come in contact with the intake port yet.

Due to the above-mentioned pressure difference between the both sides of the rotor, the rotor is forced to shift to one of the sides thereof. Due to this force, one of the sides of the rotor is pressed against the side housing whereas the side seal of the other side of the rotor is instantly separated from the other side housing.

Therefore, frictional resistance is generated between the rotor and the one of the side housings while the high pressure gas further leaks into the side face space of the other side of the rotor through the side seal so that the engine is excessively heated due to the leakage of the high temperature combustion gas. This causes loss of power and overheat of the engine.

In accordance with the present invention, with regard to the structure of the related art mentioned above which comprises a pair of side housings disposed in both sides of a rotor and a center housing wherein each housing has an intake port disposed in such a way that an opening end thereof is dislocated from that of the opposing intake port facing thereto in one of the sides of the rotor inside of the side seal, wherein the opening end of the center housing is dislocated to the retard side and wherein an improvement resides in that a relief port is provided in the side housing at the dislocated portion of the opening end of the intake port thereof in such a way that the relief port communicates with the intake port of the center housing.

Figure 1:
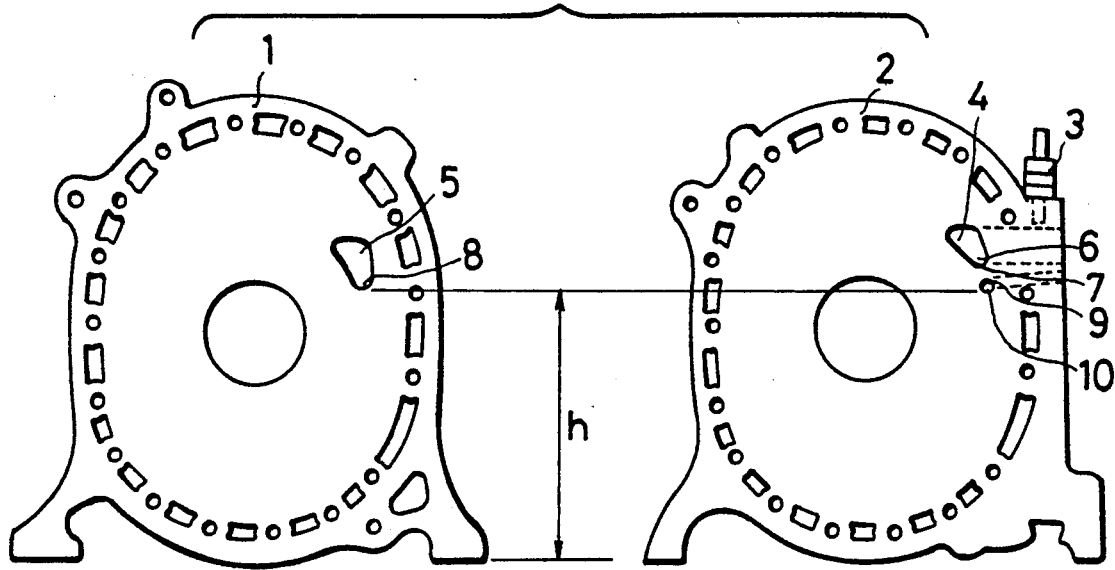
FIG. 1 is an explosive inside view of an embodiment of the rotary engine in accordance with the present invention illustrating the side housing and the center housing thereof disposed side by side for the sake of explanation.
Figure 2:
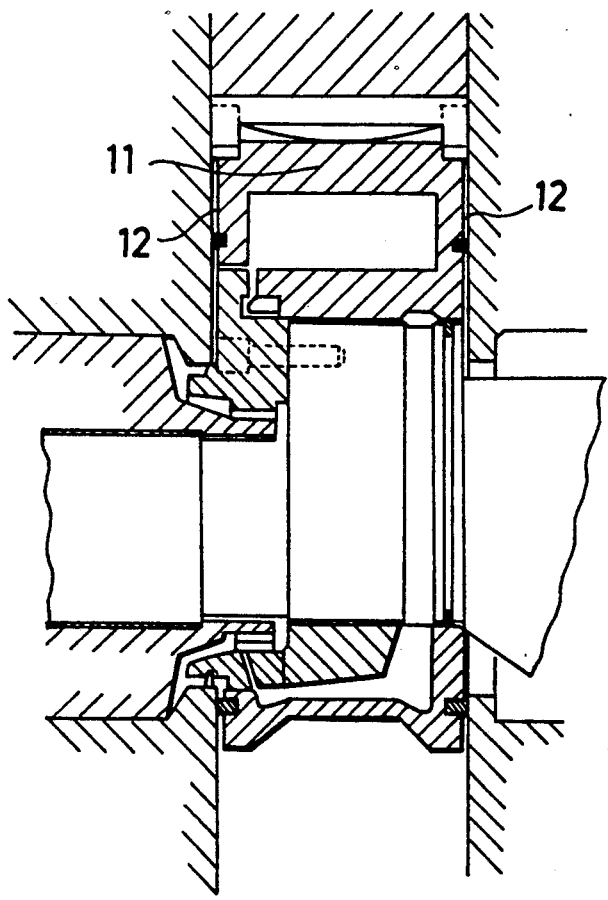
FIG. 2 is a sectional view of the rotary engine in accordance with the present invention.

An embodiment of the present invention is described hereinafter with reference to FIGS. 1 and 2. The rotary engine of this embodiment is constructed as a two-rotor rotary engine to be mounted on an automobile. The following description refers to one of the front and the rear side housings of the engine which are substantially the same together.

The rotary engine comprises an electronically controlled fuel injector 3 which is mounted on a center housing 2.

The center housing 2 has an intake port 4 into which the fuel is injected from the fuel injector 3. Also, a side housing 1 has an intake port (auxiliary port) 5 facing to the intake port 4 of the center housing 2. The diameter of the intake port 4 (or the sectional area thereof) of the center housing 2 is smaller than that of the intake port 5 of the side housing 1. The opening of the intake port 4 of the center housing 2 is dislocated from that of the intake port 5 of the side housing 1 to the retard side.

In this embodiment of the present invention, a relief port 10 is formed on the center housing 2 at a position of the dislocated portion 9 in a lower side 7 of the opening end 6 of the intake port 4 arranged in the center housing 2. The dislocated portion 9 designates a misaligned portion of the opening end of the intake port 4 of the center housing 1 with respect to that of the intake port 5 of the side housing 1. The relief port 10 is located at the same height (h) as the opening end 8 of the intake port 5 of the side housing 1 or in a very close vicinity of the opening end 8.

Due to the above-mentioned arrangement of the relief port 10 formed in the dislocated portion 9 of the intake port 4 of the center housing 2, the side faces 12, 12 of the rotating rotor 11 (FIG. 2) encounters, at the same time or almost the same time, the intake port 5 of the side housing 1 in one of the sides of the rotor 11 as well as the relief port 10 of the center housing 2 in the other side of the rotor 11. Into the narrow space between the housing and the side faces 12 and 12 of the rotor 11 enters the high pressure blow-bye gas and remains there. However, the gas simultaneously and thus evenly escapes from both side face spaces 12 and 12 of the rotor 11 as mentioned above so that the pressure difference is not generated between both sides of the rotor 11.

Accordingly, the rotor 11 is prevented from being forced to shift toward one of the sides thereof due to the pressure difference between the two sides thereof. Therefore, the side seals arranged in both sides of the rotor slide evenly on the side face plane facing thereto.

Therefore, it becomes possible to prevent the high pressure gas from entering into the inside of the rotor through the upper edge of the side seal when the seal is disconnected from the side plane of the housing, thus avoiding the leakage of gas and overheat of the engine.

Especially, it is an advantage of the above-mentioned rotary engine that it makes it possible to avoid overheat of the engine since the gas leakage into the inside of the rotor is reliably prevented, which makes it possible to avoid the overheat of engine due to the pressure difference in a multi-rotor engine such as a three-rotor engine or a four-rotor engine wherein the problem of the pressure difference was supposed to be difficult to overcome in accordance with the prior art structure.

Figure 3:
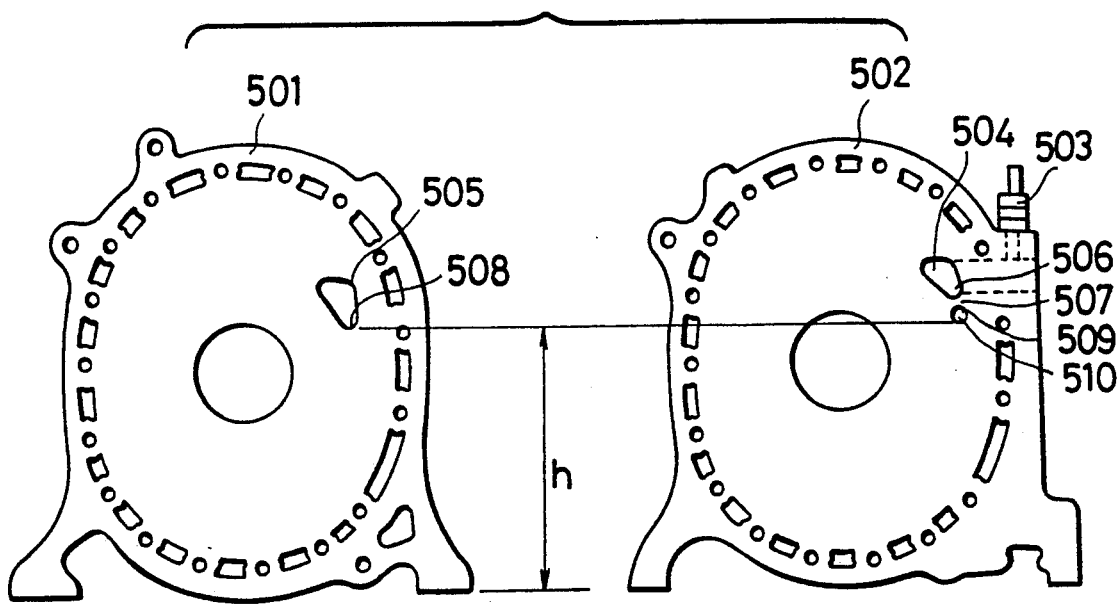
FIG. 3 is an explosive inside view of another embodiment of the rotary engine in accordance with the present invention illustrating the side housing and the center housing thereof disposed side by side for the sake of explanation.
Figure 4:
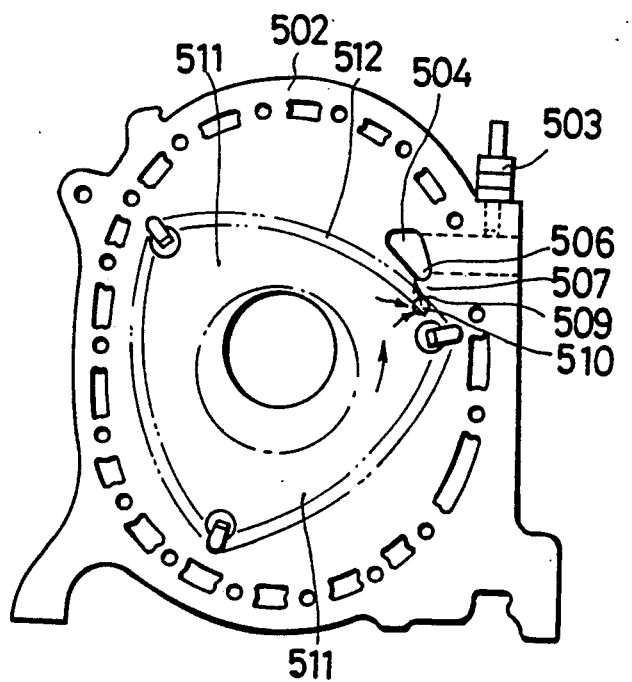
FIG. 4 is a constructional view of the rotary engine in accordance with the present invention for explaining the structure thereof.
Figure 5:
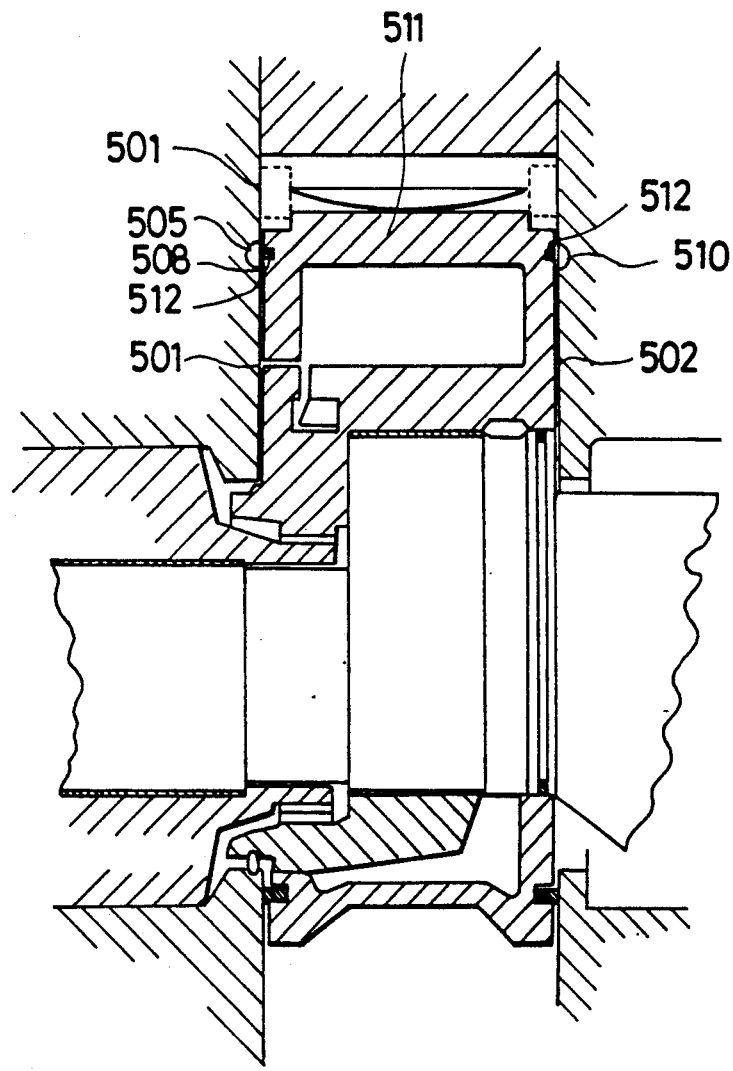
FIG. 5 is a sectional view of a main portion of the rotary engine in accordance with the present invention.

Another embodiment of the present invention is described hereinafter with reference to FIGS. 3 and 4. The rotary engine of this embodiment is constructed as a two-rotor rotary engine to be mounted on an automobile as the first embodiment of the invention of FIGS. 1 and 2 mentioned above. The following description refers to one of the front and the rear side housings of the engine which are substantially the same together.

The rotary engine comprises an electronically controlled fuel injector 503 which is mounted on a center housing 502.

The center housing 502 has an intake port 504 into which the fuel is injected from the fuel injector 203. Also, a side housing 501 has an intake port (auxiliary port) 505 facing to the intake port 504 of the center housing 502. The diameter of the intake port 504 (or the sectional area thereof) of the center housing 502 is smaller than that of the intake port 505 of the side housing 501. The opening of the intake port 504 of the center housing 502 is dislocated from that of the intake port 505 of the side housing 501 to the retard side.

In this embodiment of the present invention, a recess 510 is formed on the center housing 502 at a position of the dislocated portion 509 in a lower side 507 of the opening end 506 of the intake port 504 arranged in the center housing 502. The dislocated portion 509 designates a misaligned portion of the opening end of the intake port 504 of the center housing 501 with respect to that of the intake port 505 of the side housing 501. The recess 510 is located at the same height (h) as the opening end 508 of the intake port 505 of the side housing 501 or in a very close vicinity of the opening end 508.

That is, the above-mentioned arrangement of the recess 510 aims to realize a simultaneous timing when one of the side seals 512 and 512 disposed on both sides of the rotor 511 crosses the recess 510 formed on the center housing 502 and when the other side seal 512 crosses the opening end 508 of the side housing 501 facing to the recess 510.

Figure 6:
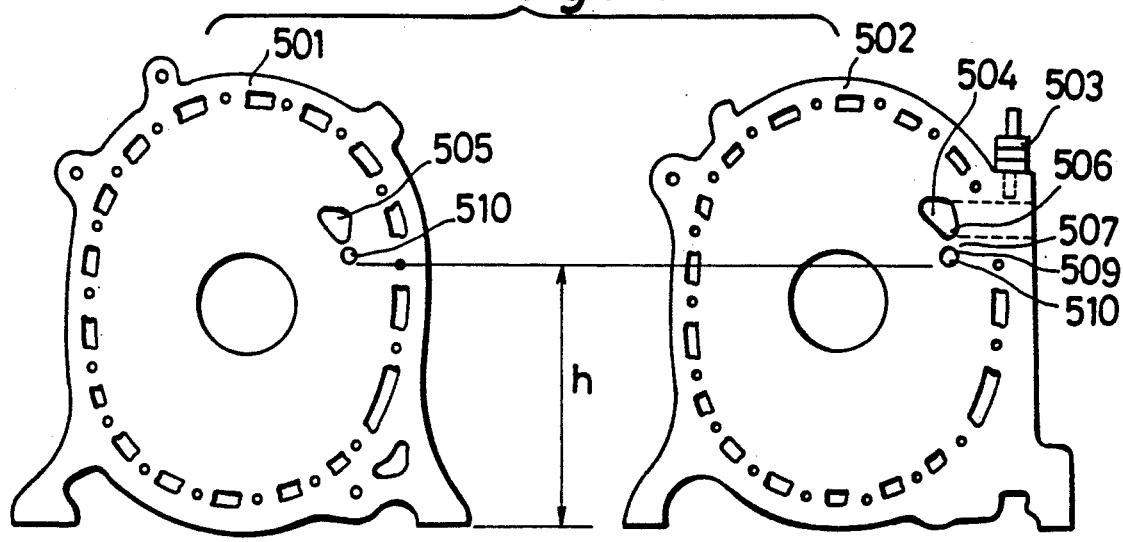
FIG. 6 is an explosive inside view of still another embodiment of the rotary engine in accordance with the present invention illustrating the side housing and the center housing thereof disposed side by side for the sake of explanation.

A variant of this embodiment is illustrated in FIG. 6.

In accordance with this structure, the recess (or hole) 510 is formed in the side housing 501 in addition to forming it in the center housing 502. Both recesses 510 are formed symmetrically with respect to each other and facing to each other on the side housing 501 and the center housing 502, respectively.

It is apparent that the recesses 510 and 510 are arranged in such a way that the side seals 512 and 512 disposed on both sides of the rotor 511 cross the recesses 510 and 510 at the same time so as to simultaneously escape the high pressure gas remaining inside of the side seals 512 in both sides of the rotor 511, thus avoiding the generation of the blow-bye gas pressure difference between both sides of the rotor 511. Note that each recess 510 may be connected to the intake port provided in each of the housings, respectively.

Due to the above-mentioned arrangement of the recess 510 formed in the lower part of the dislocated portion 509 of the intake port 504 of the center housing 502, the side seals 512, 512 of the rotating rotor 511 (FIG. 4) encounters, at the same time or almost the same time, with the opening end 508 of the intake port 505 of the side housing 501 in one of the sides of the rotor 511 as well as the recess 510 of the center housing 502 in the other side of the rotor 511. Into the narrow space between the housing and the side faces enclosed by the side seals 512 and 512 of the rotor 511 enters the high pressure blow-bye gas and remains there. However, the gas simultaneously and thus evenly escapes from both side face spaces of the rotor 511 as mentioned above so that the pressure difference is not generated between both sides of the rotor 511.

Accordingly, the rotor 511 is prevented from being forced to shift toward one of the sides thereof due to the pressure difference between the two sides thereof. Therefore, the side seals 512 and 512 arranged in both sides of the rotor 511 slide evenly on the side face plane facing thereto.

Therefore, it becomes possible to prevent the high pressure gas from entering into the inside of the rotor through the upper edge of the side seal when the seal is disconnected from the side plane of the housing, thus avoiding the leakage of gas and overheat of the engine.

Especially, it is an advantage of the above-mentioned rotary engine that it makes it possible to avoid overheat of the engine since the gas leakage into the inside of the rotor is reliably prevented, which makes it possible to avoid the overheat of engine due to the pressure difference in a multi-rotor engine such as a three-rotor engine or a four-rotor engine wherein the problem of the pressure difference was supposed to be difficult to overcome in accordance with the prior art structure.

Another embodiment of the present invention is described hereinafter.

Figure 17:
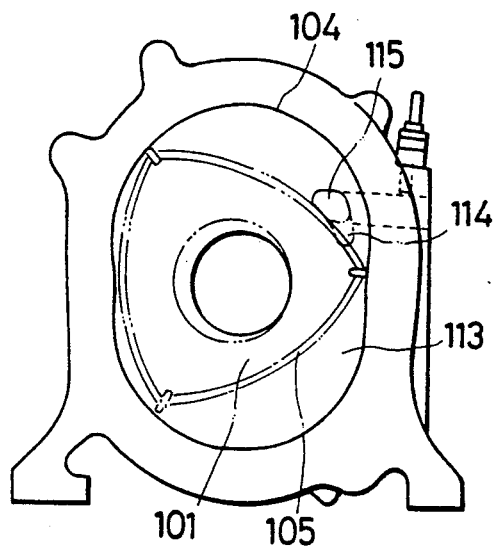
FIG. 17 is a side view of the rotor of the rotary engine in accordance with the related art.

In accordance with the related art rotary engine, before improvements are made, which engine comprises an electronically controlled fuel injection system using an injector, as illustrated in FIG. 17, the intake port 115 of the intermediate housing in which the injector is disposed is smaller than the intake port 114 of the side housing, therefore the opening end portions of the intake ports 114 and 115 of the intermediate housing and the side housing are not aligned with each other.

Therefore, the opening ends of the two intake ports 114 and 115 of the housings are dislocated with respect to each other. More precisely, the opening end of the main intake port 115 of the intermediate housing is located in the retard side with respect to the opening end of the intake port 114 of the side housing.

As a result of such a misalignment of the intake ports disposed in both sides of the rotor, especially that of the opening ends thereof, the timing of connection between the intake port and the side face space of the rotor becomes different for each of the sides of the rotor, respectively, according to the rotation of the rotor.

Therefore, the timing of flowing the blow-bye gas which leaks through the side seal of the rotor into the inside thereof becomes different for each of the sides of the rotor. More precisely, with regard to the rotor side face space which in advance comes in contact with the intake port, the blow-bye gas passes through the space ahead so that the gas pressure in the space of this side is lowered while the other side space is still maintained at a high pressure since the space of the other side has not come in contact with the intake port yet.

Due to the above-mentioned pressure difference between the both sides of the rotor, the rotor is forced to shift to one of the sides thereof. Due to this force, one of the sides of the rotor is pressed against the side housing whereas the side seal of the other side of the rotor is instantly separated from the other side housing.

Therefore, frictional resistance is generated between the rotor and the one of the side housings while the high pressure gas further leaks into the side face space of the other side of the rotor through the side seal so that the engine is excessively heated due to the leakage of the high temperature combustion gas. This causes loss of power and overheat of the engine.

Figure 18:
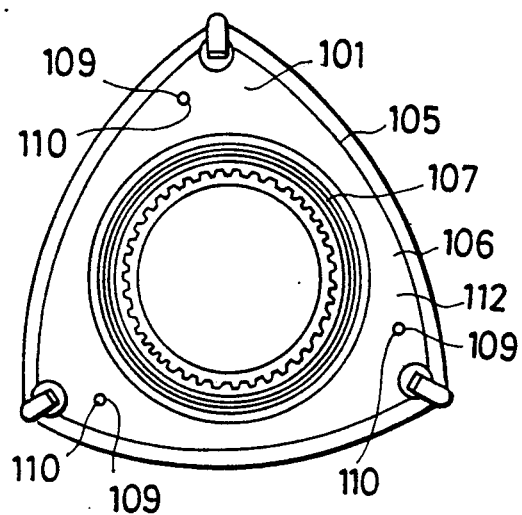
FIG. 18 is a side view of anothe example of the rotor of the rotary engine in accordance with the related art.

It is to be noted that, in the related art peripheral intake type rotary engine comprising an intake port disposed inside of the rotor housing trochoid surface, in order to equalize the blow-bye gas pressure in both sides of the rotor to cope with the above-mentioned problems, a gas pressure balance port 109, as illustrated in FIG. 18, is provided through the rotor to connect both sides thereof. However, the balance port is a simple hole penetrating through the rotor and the opening surface plane of the hole is the same as that of the rotor side surface. Therefore, the gap between the opening on the rotor side face and the sliding surface of the side housing (or intermediate housing) is very small (about 0.2 mm) and the passage space toward the balance port is very narrow so that flow resistance is large and flow rate is small. Therefore, the problems due to the pressure difference between both sides of the rotor are not obviated by the conventional balance port structure.

It is to be noted that in FIGS. 17 and 18, numeral 101 designates a rotor, numeral 103 designates a side housing, numeral 104 designates an intermediate housing, numeral 105 designates a side seal, numeral 106 designates a rotor side surface, numeral 107 designates an oil seal and numeral 110 designates an opening.

In accordance with the embodiment of the present invention, the flow rate of the gas passing through the pressure balance port formed in the rotor is increased so as to minimize the pressure difference of the blow-bye gas between both sides of the rotor.

Figure 8:
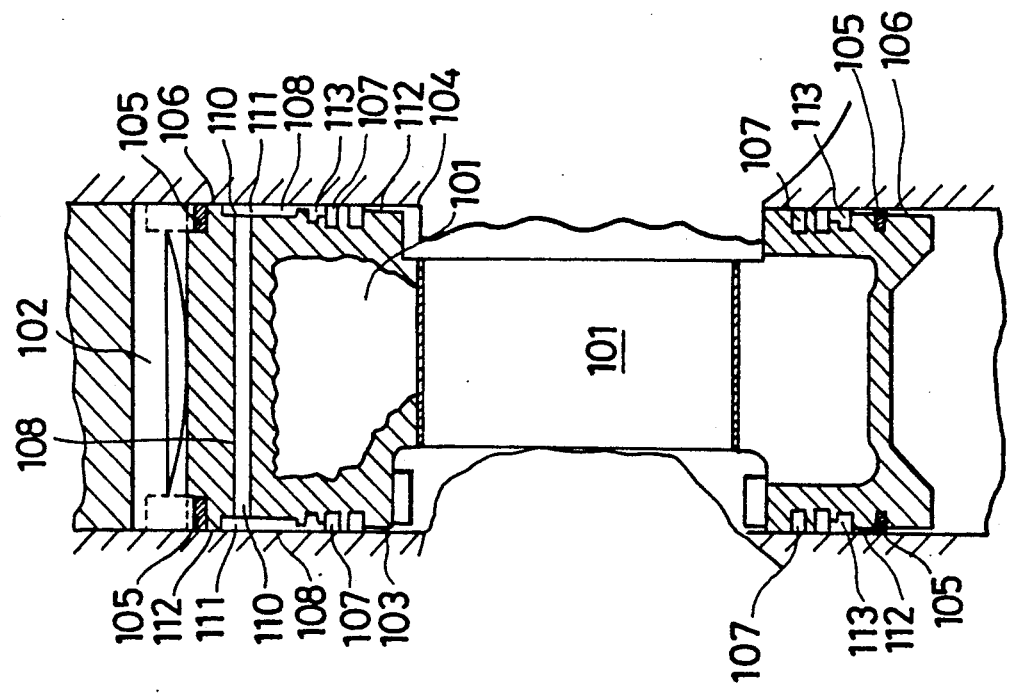
FIG. 8 is a sectional view of a main portion of the rotor of the rotary engine in accordance with the present invention.
Figure 7:
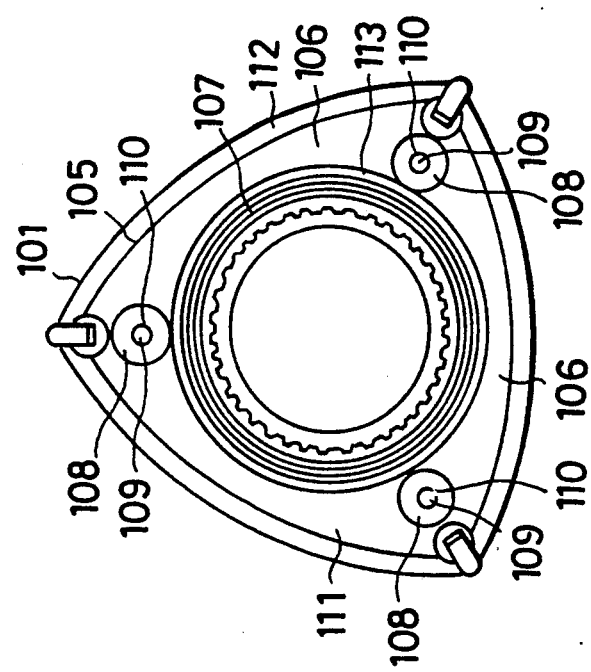
FIG. 7 is a side view of the rotor of the rotary engine in accordance with the present invention.

FIG. 7 illustrates a side view of the rotor in accordance with this embodiment of the present invention and FIG. 8 illustrates a sectional view of the main portion of the rotary engine of this embodiment.

In FIGS. 7 and 8, numeral 101 designates a rotor, numeral 102 designates a rotor housing, numeral 103 designates a side housing, numeral 104 designates an intermediate housing, numeral 105 designates a side seal, numeral 106 designates a side face portion of the rotor, numeral 107 designates an oil seal, numeral 108 designates a chamfer, numeral 109 designates a through hole, numeral 110 designates an opening, numeral 111 designates an inside area between the side seal 105 and the oil seal 107, numeral 112 designates a side surface of the rotor, numeral 113 designates a groove for introducing gas, numeral 114 designates an intake port of the side housing, and numeral 115 designates an intake port of the intermediate housing.

In accordance with this embodiment of the present invention, a chamfer 108 is formed in the space between the side seal 105 and the oil seal 107 in both sides of the rotor 101. The chamfer 108 has a desirable and necessary area and shape in that space. The through hole 109 penetrates through the rotor 101 from the chamfer 108 in one of the side faces 106 of the rotor 101 to the other chamfer 108 in the other side face 106 of the rotor 101.

That is, the opening 110 of the through hole 109 is located within the area of the chamfer 108.

Figure 9:
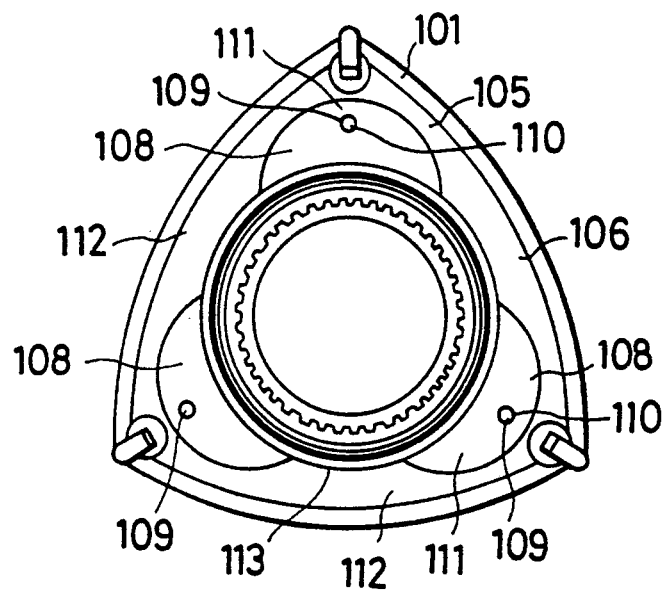
FIG. 9 is a side view of a variant of the rotor of the rotary engine in accordance with the present invention.
Figure 10:
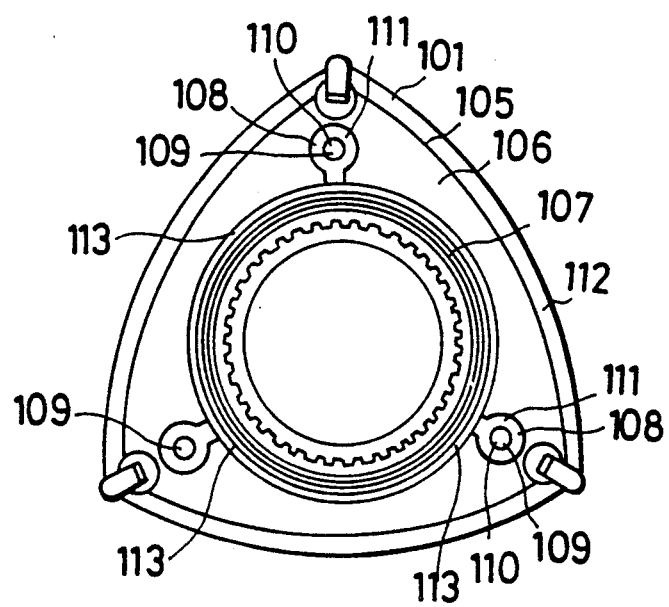
FIG. 10 is a side view of another variant of the rotor of the rotary engine in accordance with the present invention.

As illustrated in FIG. 8, the chamfer 108 is recessed from the side surface 112 of the roter 101 in the inside area 111 of the side portion 106 of the rotor 101. The chamfer 108 may be formed in a shape of recessed circle, as illustrated in FIG. 7. Also, the chamfer 108 may be formed in a large shape occupying a wide area in the inside area 111 of the side portion 106 of the rotor 101, as illustrated in FIG. 9. The gas introduction groove 113 is formed near and outer the oil seal 107 in the inside area 111 between the oil seal 107 and the side seal 105 in the side portion 106 of the rotor 101. The chamfer 108 may be connected to this gas introduction groove 113 so as to enhance the effect of the present invention.

It should be noted that the chamfer 108 and the through hole 109 must be formed considering the weight balance of the rotor 101.

In accordance with the particular embodiment of the present invention, three through holes 109 are formed, each through hole being located in the vicinity of each apex of the substantially triangle rotor 101 as close as possible. Also, each of the through holes 109 is formed at a position where the trace of the through hole 109 covers the opening of the intake port 114 of the side housing 103 and the opening of the intake port 115 of the intermediate housing 104 according as the rotor is rotated, so that the blow-bye gas is effectively exhausted.

As mentioned above, in accordance with the present invention, the opening 110 of the through hole 109 is formed in the chamfer 108 wherein the through hole 109 is formed in the vicinity of each of the three apices of the rotor 101 which is substantially triangle and the chamfer 108 is recessed from the side face plane of the rotor 101. Therefore, the space for flowing the gas is enlarged because of the chamfer 108, so that the flow resistance is decreased.

Accordingly, tha gas is effectively guided to the opening 110 of the through hole 109 and the flow rate of the gas passing through the through hole 109 increases so that the blow-bye gas in both sides of the rotor 101 is quickly and reliably exhausted, thus extinguishing the gas pressure difference between both sides of the rotor 101.

Accordingly, the rotor 101 is prevented from being forced to shift toward one of the sides thereof due to the pressure difference between the two sides thereof. Therefore, the side seals 105 and 105 arranged in both sides of the rotor 101 slide evenly on the side face planes of the side housing 103 and the intermediate housing 104, each plane facing thereto.

Therefore, it becomes possible to prevent the high pressure gas from entering into the inside area 111 between the side seal 105 and the oil seal 107 in the side face portion 106 of the rotor 101 through the upper edge of the side seal when the seal is disconnected from the side plane of the housing, thus avoiding the leakage of gas and overheat of the engine.

Especially, it is an advantage of the above-mentioned rotary engine that it makes it possible to avoid overheat of the engine since the gas leakage into the inside of the rotor is reliably prevented, which makes it possible to avoid the overheat of engine due to the pressure difference in a multi-rotor engine such as a three-rotor engine or a four-rotor engine wherein the problem of the gas pressure difference was supposed to be difficult to overcome in accordance with the related art structure.

Another embodiment of the present invention is described hereinafter in comparison to the related art.

Figure 19:
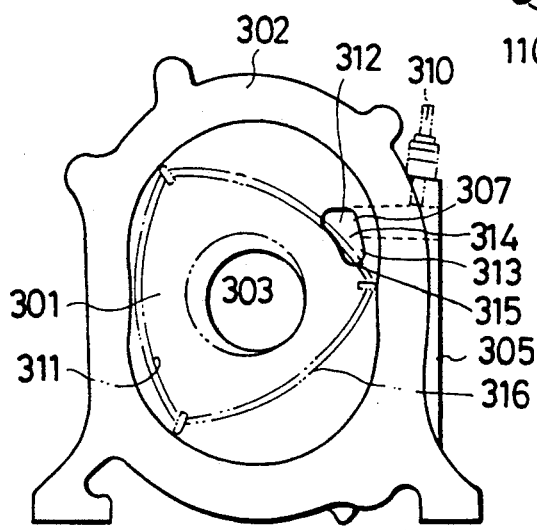
FIG. 19 is a sectional explanatory view of rotary engine in accordance with the related art, illustrating the side housing and the center housing thereof superposed on each other for the sake of explanation.

In accordance with the related art rotary engine, before improvements are made, which engine comprises an electronically controlled fuel injection system using an injector, as illustrated in FIG. 19, the intake port 312 of the intermediate housing in which the injector is disposed is smaller than the intake port 303 of the side housing, therefore the opening end portions of the intake ports 312 and 303 of the intermediate housing and the side housing are not aligned with each other.

Therefore, the opening ends 314 and 315 of the two intake ports 312 and 303 of the housings are dislocated with respect to each other.

As a result of such a misalignment of the intake ports 312 and 303 disposed in both sides of the rotor, especially that of the opening ends 314 and 315 thereof, the timing of connection between the intake port and the side face space of the rotor becomes different for each of the sides of the rotor, respectively, according to the rotation of the rotor 301.

Therefore, the timing of flowing the blow-bye gas which leaks through the side seal of the rotor into the inside thereof becomes different for each of the sides of the rotor. More precisely, with regard to the rotor side face space which in advance comes in contact with the intake port, the blow-bye gas passes through the space ahead so that the gas pressure in the space of this side is lowered while the other side space is still maintained at a high pressure since the space of the other side has not come in contact with the intake port yet.

Due to the above-mentioned pressure difference between the both sides of the rotor, the rotor is forced to shift to one of the sides thereof. Due to this force, one of the sides of the rotor is pressed against the side housing whereas the side seal of the other side of the rotor is instantly separated from the other side housing.

Therefore, frictional resistance is generated between the rotor and the one of the side housings while the high pressure gas further leaks into the side face space of the other side of the rotor through the side seal so that the engine is excessively heated due to the leakage of the high temperature combustion gas. This causes loss of power and overheat of the engine.

Figure 11:
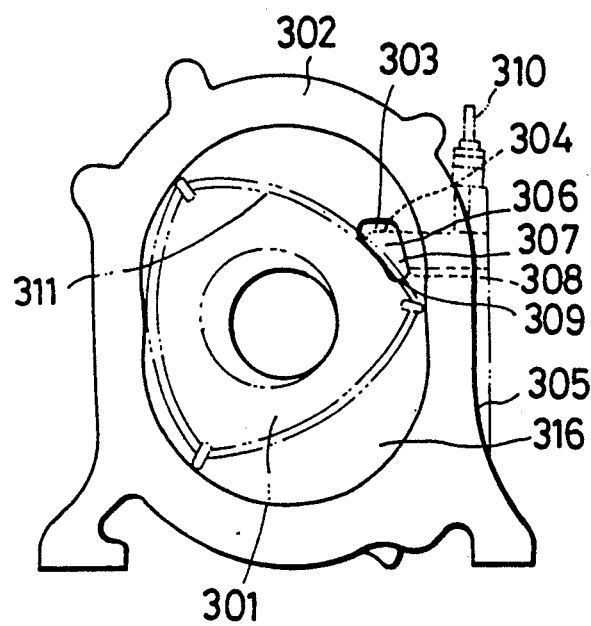
FIG. 11 is a sectional explanatory view of an embodiment of the rotary engine in accordance with the present invention, illustrating the side housing and the center housing thereof superposed on each other for the sake of explanation.
Figure 12:
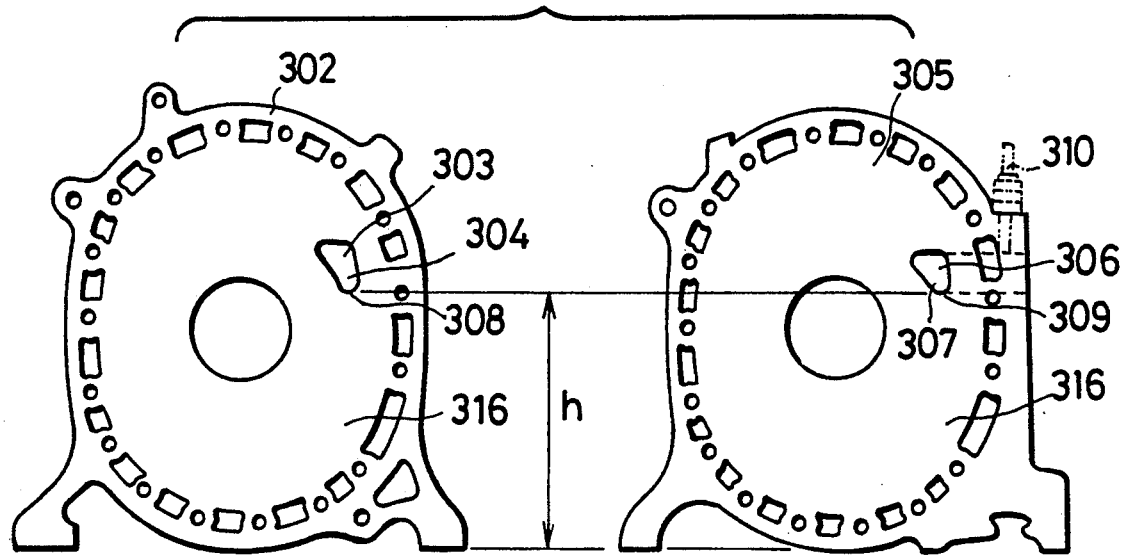
FIG. 12 is an explosive inside view of still another embodiment of the rotary engine in accordance with the present invention, illustrating the side housing and the center housing thereof disposed side by side for the sake of explanation.

The above-mentioned problems are obviated by the embodiment of the present invention illustrated in FIGS. 11 and 12.

FIG. 11 illustrates a sectional view of a side housing and a center housing (intermediate housing) superposed one above the other of the rotary engine in accordance with the present invention. And FIG. 12 illustrates an explosive view of the rotary engine representing location of the intake port of the side housing and that of the center housing, respectively.

In this embodiment of the present invention illustrated in FIGS. 11 and 12, the rotary engine comprises a rotor 301, a side housing 302 disposed in one of sides of the rotor 301 and a center housing 305 disposed in the other side of the rotor 301, wherein the side housing 302 has an intake port 303 formed therein and the center housing 305 has an intake port 306 formed therein and wherein the intake port 303 has an opening end 308 at an opening 304 thereof and the intake port 306 has an opening end 309 at an opening 307 thereof, in which the opening ends 308 and 309 are located at the same elevational position (height), aligning with each other.

An injector 310 is directly faces to the intake port 306 formed in the center housing 305 in both sides of the rotor 301. At the opening of this intake port 306, the diameter (or sectional area) thereof is small in comparison to that of the intake port 303 of the side housing 302, in order to supply a rich mixture. However, the opening end 308 of the intake port 303 and the opening end 309 of the intake port 306 are located at the same height (h), as illustrated in FIG. 12.

Figure 13:
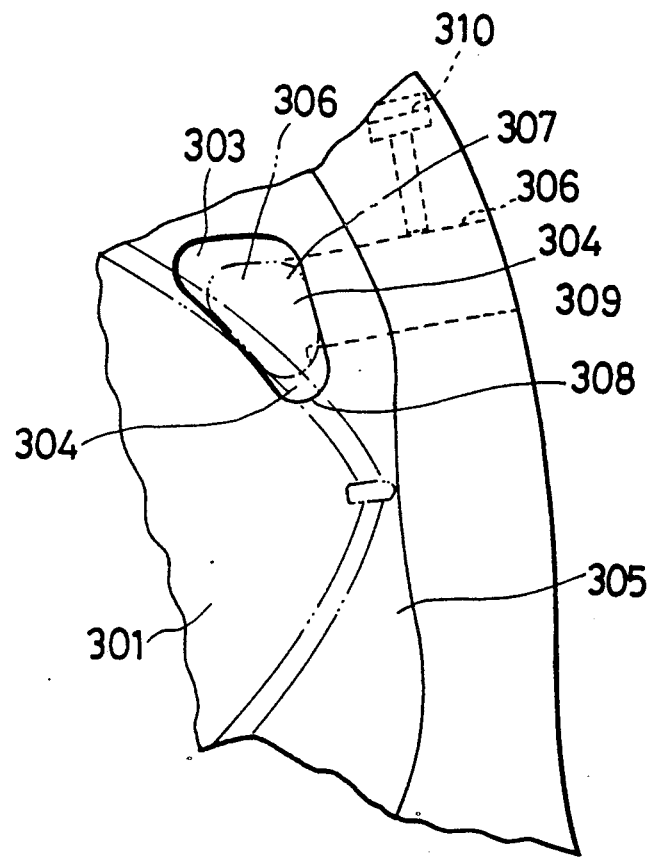
FIG. 13 is an enlarged explanatory view of the intake ports disposed in both sides of the rotary engine in accordance with still another embodiment of the present invention.

Another embodiment of the present invention is illustrated in FIG. 13. This embodiment of the rotary engine comprises a rotor 301, a side housing 302 disposed in one of the sides of the rotor 301 and a center housing 305 disposed in the other side of the rotor, wherein the side housing 302 has an intake port 303 having an opening 304 and the center housing 305 has an intake port 306 having an opening 307 which faces to the opening 304 of the intake port 303. The opening 304 of the intake port 303 has an opening end (lower end) 308. The opening 307 of the intake port 306 has an opening end (lower end) 309. A featured arrangement of this embodiment resides in that the opening ends 308 and 309 of the intake ports 303 and 306 are positioned close to each other to such a distance (difference of height) that the pressure of gas which enters into both side spaces of the rotor 301 becomes a balanced state for each of the side spaces and the gas is evenly exhausted therefrom so that the rotor 301 is prevented from being urged to shift toward one side thereof due to the gas pressure difference between the two sides of the rotor 301.

In accordance with the related turbo rotary engine, the distance (difference of height) between the opening ends 308 and 309 is about 20 mm. On the other hand, in accordance with the present invention, the distance is reduced to about 10 mm or less for the turbo rotary engine and about 5 mm for nonturbo rotary engine.

Due to the above-mentioned structure in accordance with the present invention, it becomes possible to minimize the gas pressure difference between the both sides of the rotor, which makes it possible to obviate the problem that the rotor is forced to shift to one side thereof by the pressure difference.

As mentioned above, in accordance with the embodiment of the present invention, the rotary engine comprises the side housing 302 disposed in each side of the rotor 301 and the center housing 305 wherein the side housing 302 has the intake port 303 having the opening end 308 and the center housing 305 has the opening end 309 and wherein the improvement resides in that the two opposing opening ends 308 and 309 are arranged in the vicinity relative to each other close enough to substantially equalize the pressure of gas in both sides of the rotor 301 so that the intake function is started at the same time in both sides of the rotor 301 according to the rotation thereof and that the high pressure gas introduced into the both side spaces of the rotor 301 is evenly and simultaneously exhausted therefrom.

Accordingly, the rotor 301 is prevented from being forced to shift toward one of the sides thereof due to the pressure difference between the two sides thereof. Therefore, the side seals 311 and 311 arranged in both sides of the rotor 301 slide evenly on the side face planes of the side housing 302 and the intermediate housing 305, each plane facing thereto.

Therefore, it becomes possible to prevent the high pressure gas from entering into the inside area inside of the side seal 311 in the side face portion of the rotor 301 through the upper edge of the side seal 311 when the seal is disconnected from the side plane of the housing, thus avoiding the leakage of gas and overheat of the engine.

Especially, it is an advantage of the above-mentioned rotary engine that it makes it possible to avoid overheat of the engine since the gas leakage into the inside of the side seal of the rotor is reliably prevented, which makes it possible to avoid the overheat of engine due to the pressure difference in a multi-rotor engine such as a three-rotor engine or a four-rotor engine wherein the problem of the gas pressure difference was supposed to be difficult to overcome in accordance with the prior art structure.

Still another embodiment of the present invention is described hereinafter with reference to FIGS. 14 and 15.

Figure 14:
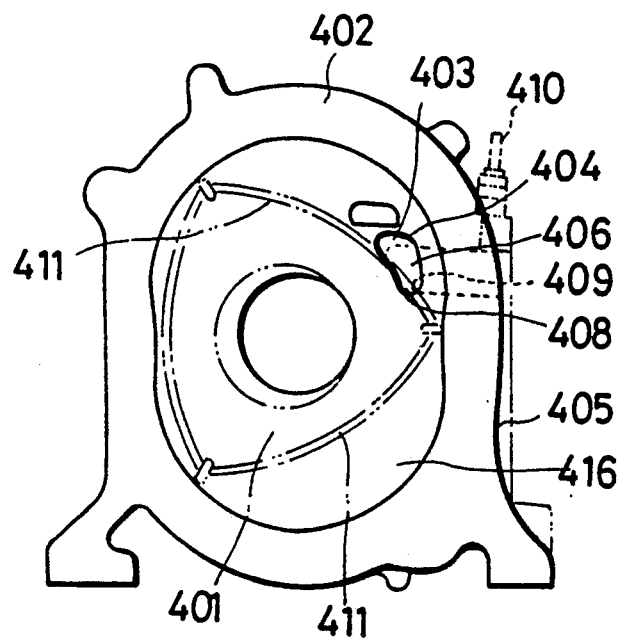
FIG. 14 is a sectional explanatory view of still another embodiment of the rotary engine in accordance with the present invention, illustrating the side housing and the center housing thereof superposed on each other for the sake of explanation.

FIG. 14 illustrates a sectional view of a side housing and a center housing (intermediate housing) superposed one above the other of the rotary engine in accordance with the present invention. And FIG. 15 illustrates an explosive view of the rotary engine representing location of the intake port of the side housing and that of the center housing, respectively.

Figure 15:
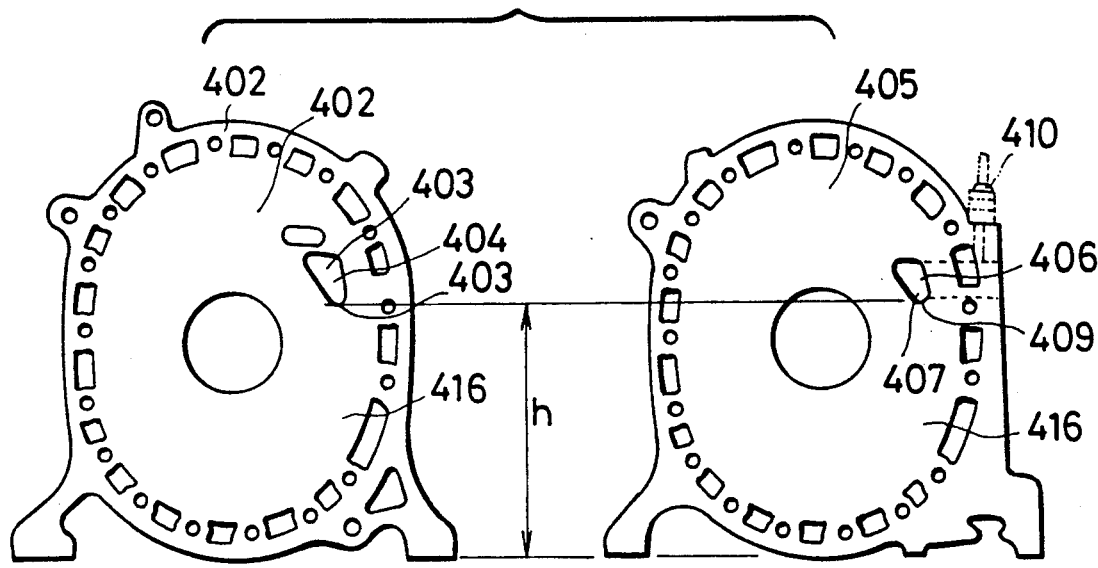
FIG. 15 is an explosive inside view of the embodiment of FIG. 14, illustrating the side housing and the center housing thereof disposed side by side for the sake of explanation.

In this embodiment of the present invention illustrated in FIGS. 14 and 15, the rotary engine comprises a rotor 401, a side housing 402 disposed in one of the sides of the rotor 401 and a center housing 405 disposed in the other side of the rotor 401, wherein the side housing 402 has an intake port 403 formed therein and the center housing 405 has an intake port 406 formed therein and wherein the intake port 403 has an opening end 408 at an opening 404 thereof and the intake port 406 has an opening end 409 at an opening 407 thereof, in which the opening ends 408 and 409 are located at the same position, aligning with each other.

An injector 410 is directly faces to the intake port 406 formed in the center housing 405 in both sides of the rotor 401. At the opening of this intake port 406, the diameter (or sectional area) thereof is small in comparison to that of the intake port 403 of the side housing 402, in order to supply a rich mixture. However, the opening end 408 of the intake port 403 and the opening end 409 of the intake port 406 are located at the same height (h), as illustrated in FIG. 15.

Due to the above-mentioned structure in accordance with the present invention, it becomes possible to minimize the gas pressure difference between the both sides of the rotor, which makes it possible to obviate the problem that the rotor is forced to shift to one side thereof by the pressure difference.

As mentioned above, in accordance with the embodiment of the present invention, the rotary engine comprises the side housing 402 disposed in each side of the rotor 401 and the center housing 405 wherein the side housing 402 has the intake port 403 having the opening end 408 and the center housing 405 has the opening end 409 and wherein the improvement resides in that the two opposing opening ends 408 and 409 are arranged at the same height in both sides of the rotor 401 so that the intake function is started at the same time in both sides of the rotor 401 according to the rotation thereof and that the high pressure gas introduced into the both side spaces of the rotor 401 is evenly and simultaneously exhausted therefrom.

Accordingly, the rotor 401 is prevented from being forced to shift toward one of the sides thereof due to the pressure difference between the two sides thereof. Therefore, the side seals 411 and 411 arranged in both sides of the rotor 401 slide evenly on the side face planes of the side housing 402 and the intermediate housing 405, each plane facing thereto.

Therefore, it becomes possible to prevent the high pressure gas from entering into the inside area inside of the side seal 411 in the side face portion of the rotor 401 through the upper edge of the side seal 411 when the seal is disconnected from the side plane of the housing, thus avoiding the leakage of gas and overheat of the engine.

Especially, it is an advantage of the above-mentioned rotary engine that it makes it possible to avoid overheat of the engine since the gas leakage into the inside of the side seal of the rotor is reliably prevented, which makes it possible to avoid the overheat of engine due to the pressure difference in a multi-rotor engine such as a three-rotor engine or a four-rotor engine wherein the problem of the gas pressure difference was supposed to be difficult to overcome in accordance with the related art structure.

Many widely different embodiments of the present invention may be constructed without departing from the spirit and scope of the present invention. It should be understood that the present invention is not limited to the specific embodiments described in the specification, except as defined in the appended claims.

What is claimed is:

1. A rotary engine comprising:
   a rotor having two side faces;
   a first side housing facing one of said two side faces of said rotor so as to define a first space between said one side face of the rotor and said first side housing, and having a first intake port formed therein with a predetermined opening area; and
   a second side housing facing the other of said two side faces of said rotor so as to define a second space between said other side face of the rotor and said second side housing, and having a second intake port formed therein, the second intake port having an opening area different from the opening area of the first intake port;

a starting end for the opening of said first intake port with respect to a rotating direction of said rotor being positioned equivalent to that of a starting end for the opening of said second intake port so as to balance gas pressures in the first space and the second space with each other.

2. A rotary engine according to claim 1, wherein the opening area of said second intake port is less than that of the opening area of said first intake port.

* * * * *